(12) United States Patent
Hayes et al.

(10) Patent No.: US 8,615,067 B2
(45) Date of Patent: Dec. 24, 2013

(54) METHOD AND APPARATUS FOR SCANNING OBJECTS IN TRANSIT

(76) Inventors: John Hayes, Tequesta, FL (US); Gary Maio, Middle Village, NY (US)

(*) Notice: Subject to any disclaimer, the term of this patent is extended or adjusted under 35 U.S.C. 154(b) by 832 days.

(21) Appl. No.: 12/836,312

(22) Filed: Jul. 14, 2010

(65) Prior Publication Data

US 2012/0076263 A1 Mar. 29, 2012

Related U.S. Application Data

(60) Provisional application No. 61/225,391, filed on Jul. 14, 2009.

(51) Int. Cl.
*G01N 23/04* (2006.01)

(52) U.S. Cl.
USPC ............................................. 378/57; 378/51

(58) Field of Classification Search
USPC .................... 378/51, 53, 55, 57, 62
See application file for complete search history.

(56) References Cited

U.S. PATENT DOCUMENTS

| | | | |
|---|---|---|---|
| 2003/0185340 A1* | 10/2003 | Frantz | 378/57 |
| 2011/0019797 A1* | 1/2011 | Morton | 378/57 |
| 2011/0116597 A1* | 5/2011 | Agrawal et al. | 378/57 |
| 2012/0027172 A1* | 2/2012 | Allman et al. | 378/57 |

OTHER PUBLICATIONS

Vehicle Inspection System for IED's, Stowaways and Contraband., Spectrum San Diego, www.spectrumsdi.com/carscan.html (2009).
Cargo Scanning, Wikipedia, http://en.wikipedia.org/wiki/Cargo_scanning, pp. 1-4 (May 30, 2009).
S. Ogorodnikov et al, "Processing of interlaced images in 4-10 MeV dual energy customs system for material recognition", Physical Review Special Topics—Accelerators and Beams, 5:1-11 (Oct. 8, 2002).
Rapiscan Systems, Cargo and vehicle inspection—Product Overview—Rapiscan Eagle M4500 Cargo Inspection System, pp. 1-7 (2007).

* cited by examiner

*Primary Examiner* — Hoon Song
(74) *Attorney, Agent, or Firm* — McHale & Slavin, P.A.

(57) ABSTRACT

A method and apparatus for identifying hazardous material or potential dangers. The method and apparatus is directed to a non-destructive, non-intrusive scanning system that uses a dual energy x-ray scanning apparatus to transmit and display data within a computer system. The software within the computer system provides for scan data transfer, a cataloging of image data and real time analytics. The real time analytics will find data from a watch list and correlate the data to the scan; it will also compare the scan data to a reference library, and it will additionally perform advanced pattern correlations to look for unusual and or suspicious patterns.

20 Claims, 5 Drawing Sheets under field. The present invention claims the benefit of provisional application 61/225,391 entitled "Method and Apparatus for Scanning Objects in Transit", filed Jul. 14, 2009, the entire contents of which is hereby expressly incorporated by reference.

METHOD AND APPARATUS FOR SCANNING OBJECTS IN TRANSIT

The present invention claims the benefit of provisional application 61/225,391 entitled "Method and Apparatus for Scanning Objects in Transit", filed Jul. 14, 2009, the entire contents of which is hereby expressly incorporated by reference.

FIELD OF THE INVENTION

The present invention is directed to a method and apparatus for identifying hazardous materials and or dangerous activities.

BACKGROUND OF THE INVENTION

Non-intrusive inspection is a non-destructive method for identifying and inspecting goods within the transportation system. With millions of cargo containers in transit on a worldwide basis, a non-intrusive inspection process by governmental agencies is a necessary deterrent to impede the flow of hazardous and illegal material. Under ideal circumstances, one hundred percent of all containers and vehicles should be inspected as the flow of people and cargo pass through sovereign borders and check points at high security installations. In order to achieve one hundred percent inspection, a relatively low cost, high speed system is needed. At present due to monetary and logistical constraints, less than one hundred percent inspection is the current protocol, which leaves the system vulnerable to failure.

DESCRIPTION OF THE PRIOR ART

Currently, various radiography techniques are being used to scan cargo containers. These radiography techniques include gamma-ray radiography, x-ray radiography, and so on. Gamma-ray radiography systems generally use Cobalt-60 or Cesium-137 as a radioactive source. Gamma detectors can produce a vertical column of image. The horizontal dimension of the image is produced by moving either the object or the scanning equipment. X-ray radiography is similar to Gamma-ray radiography, but instead of using a radioactive source it uses high energy electro magnetic radiation, Bremsstrahlung spectrum, with energy in the 5-10 MeV range that is generated by a linear particle accelerator (LINAC). X-ray systems can provide better penetration of the object but the capital and operational costs are higher than the gamma systems. While they are more adept at identifying special nuclear materials, they can expose would be stowaways to about one thousand times the amount of radiation compared to gamma.

SUMMARY OF THE INVENTION

The present invention is directed to a scanning system that utilizes a dual energy x-ray device used in conjunction with specialized computer software applications to provide a layered solution to enable static reference, real-time video analytics and advanced pattern correlation. The scanning device is capable of taking multiple images of the scanned object from different perspectives. The software will then correlate and process the data from the scanning device. The software application will provide the system operator with an easy to use interface, an informative and intuitive dashboard, the ability to compare current images with archived images, and the ability to leverage data to provide real-time situational awareness. Dual energy x-ray systems operate in the 1-10 MeV energy range and have the ability to differentiate the scanned object by material density and present the images in a colorized format while subjecting the scanned objects to ultra low radiation in the order of 10 micro rem. The system also includes a photographic digital camera device that is capable of capturing images of license plates, faces, vehicles, etc. The scanning system would provide the user with a powerful tool that would identify hazardous material or other potential dangers based upon video analytics and discern image patterns through comparison with archived images. Patterns and correlations in data may also be determined. The patterns would be automatically identified by the pattern correlation engine by comparing live real-time data to stored information, watch lists, etc. The pattern correlation engine would be continually running in the background mining data.

Accordingly, it is a primary objective of the instant invention to provide efficient and effective method and apparatus to identify hazardous material and potential dangers.

It is a further objective of the instant invention to provide a scanning system that can effectively scan a large numbers of trucks, containers, vehicles, etc. in a short period of time.

It is yet another objective of the instant invention to provide an effective scanning method and apparatus that will not expose the objects to large amounts of radioactivity.

It is a still further objective of the instant invention to provide a scanning system that has an intelligent software solution that contains a library of information that includes both a reference section and a scan catalog thereby improving the proficiency of the inspectors at the various locations.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
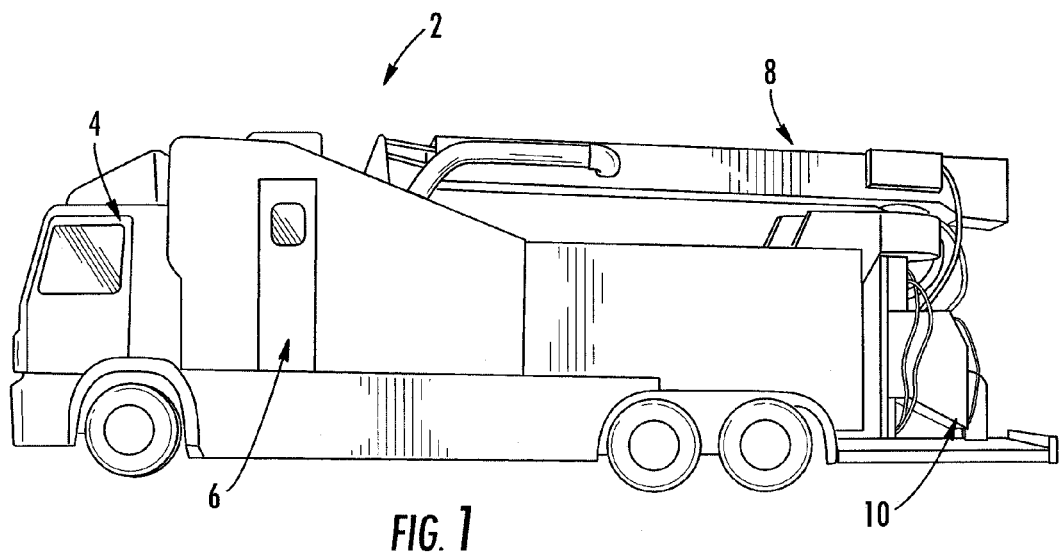
FIG. 1 is a pictorial view of a transportable dual energy x-ray scanning device that is mounted on a truck chassis.
Figure 2:
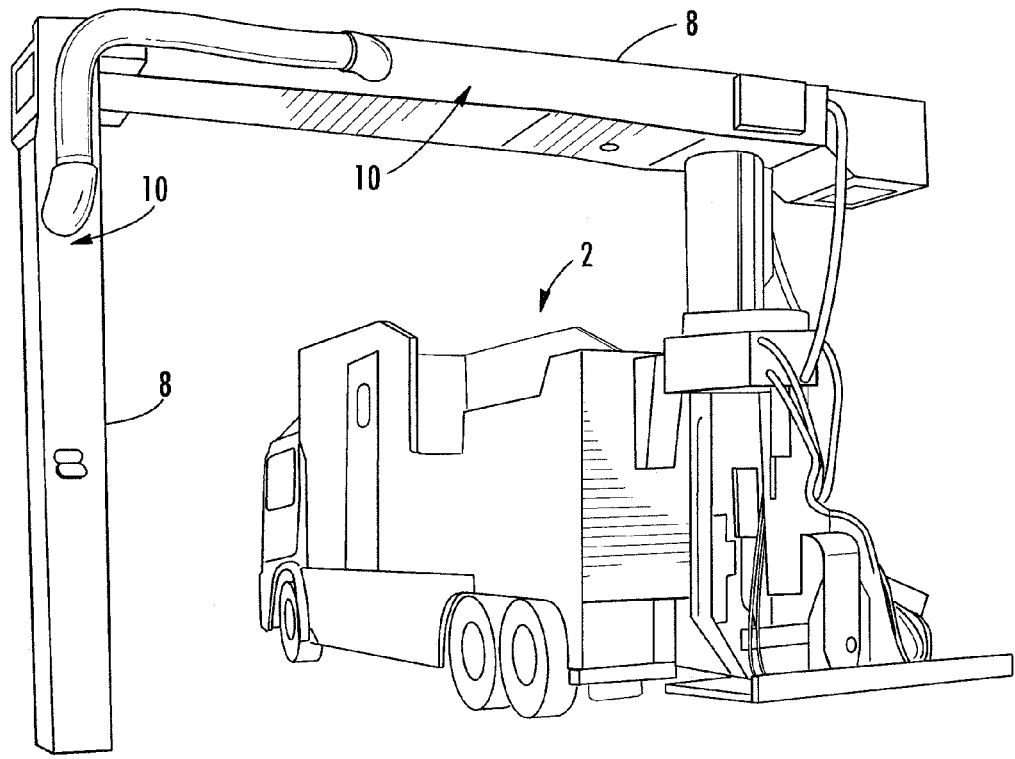
FIG. 2 is a perspective view of the transportable x-ray scanning apparatus with the x-ray detector arrays in the deployed position.
Figure 3:
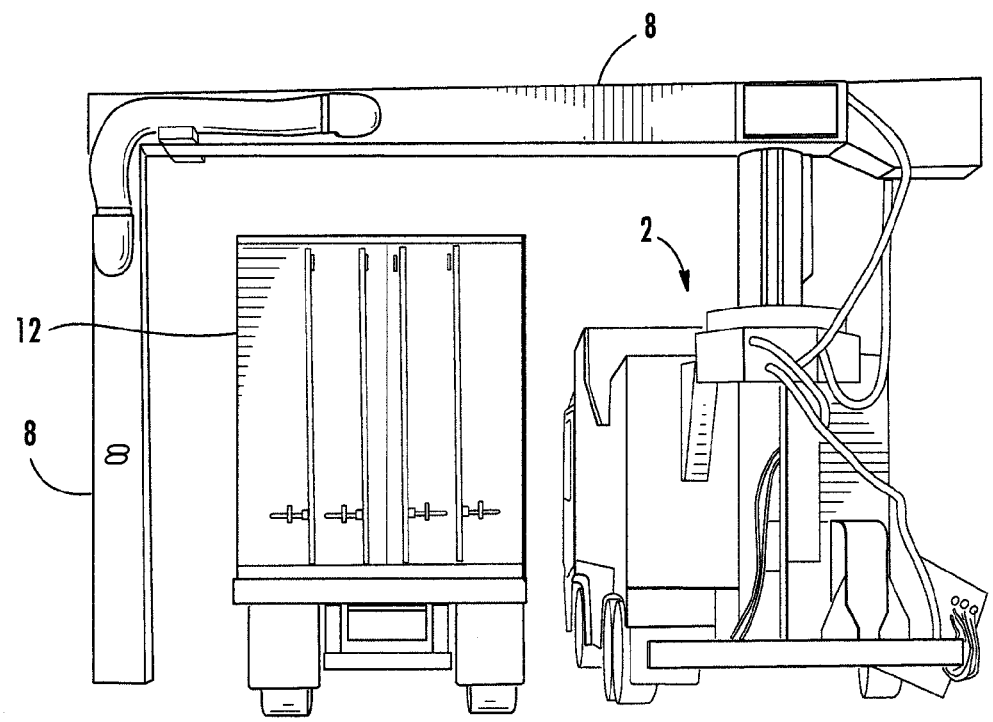
FIG. 3 is a rear view of a cargo container truck passing through the x-ray scanning apparatus.

FIG. 1 is a side view of a transportable dual energy x-ray system mounted on a truck 2. Truck 2 includes a driver's cab 4, an inspector's cab 6, a boom 8 (shown in the stowed position) and an x-ray source 10. FIG. 2 illustrates the scanning device with the boom 8 in the deployed position which locates the x-ray detector arrays 10 positioned in the proper location to perform the scanning operation. FIG. 3 is a rear view of a cargo container truck 12 passing through the x-ray scanning apparatus mounted on the truck 2 after the boom 8 has been deployed.

Figure 4:
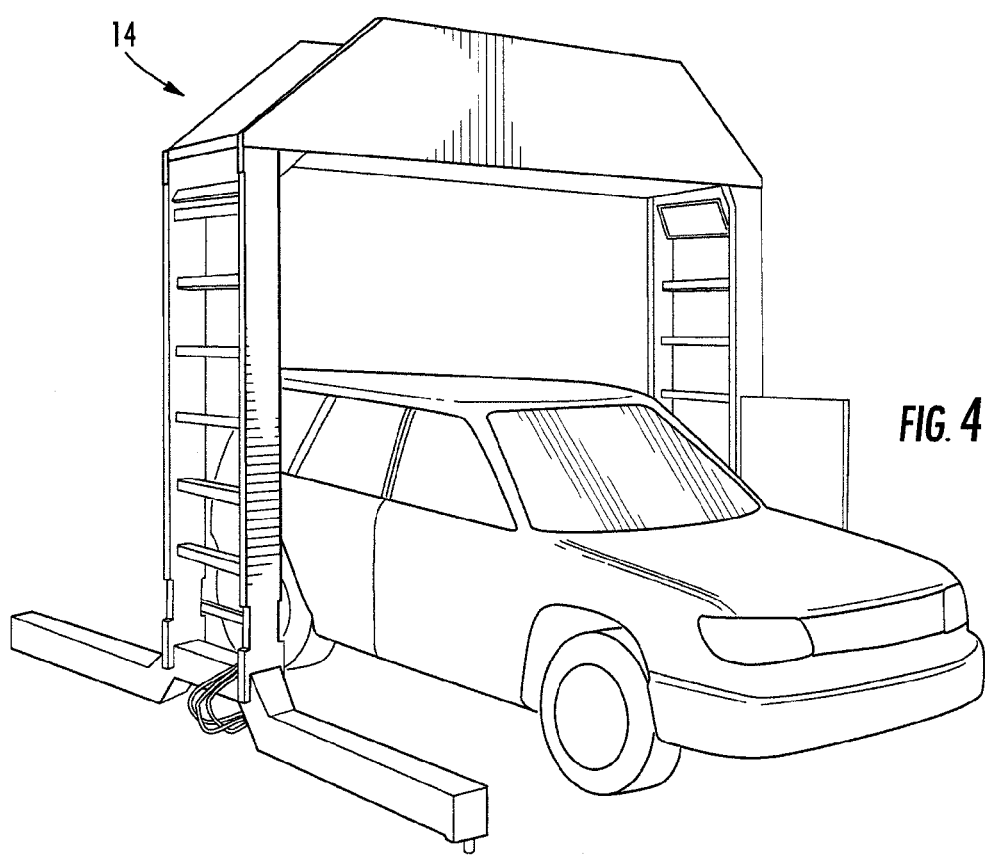
FIG. 4 is a perspective view of a repositionable dual energy x-ray scanning device designed for vehicles and light trucks.

FIG. 4 illustrates a car passing through a repositionable dual energy x-ray scanning device 14 designed for vehicles and light trucks. This drive through vehicle scanner 14 is compact, easy to set up and therefore easy to relocate. It is also therefore easy to set up even in remote locations. It is capable of quickly inspecting cars and light truck for explosives, illegal cargo and stowaways. The low x-ray emissions allow the vehicle occupants to safely remain inside the vehicle as it passes through the scanner thereby expediting the inspection process.

Figure 5:
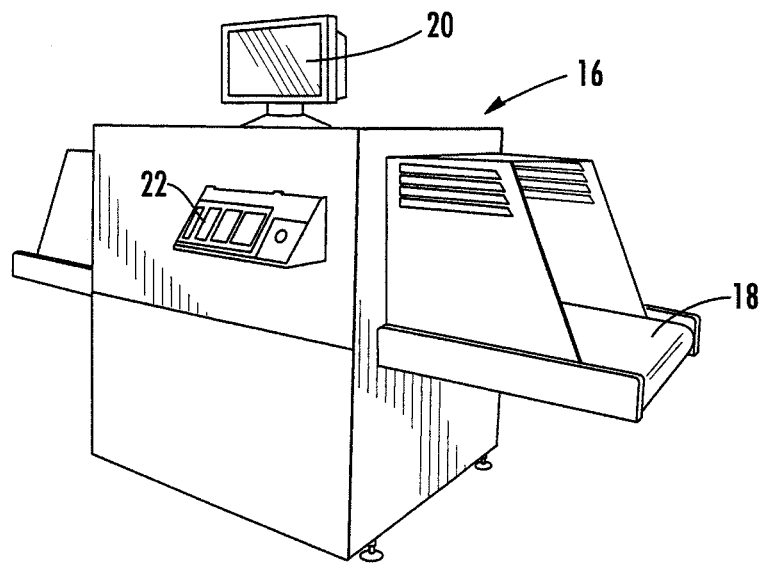
FIG. 5 is a perspective view of a dual energy x-ray scanning device designed for luggage and parcel inspection.

FIG. 5 is a perspective view of a dual energy package and luggage x-ray scanning device 16 designed for luggage and parcel inspection. Package and baggage scanner 16 includes a belt driven transport system 18 to facilitate transport of the parcel or luggage past the dual energy x-ray scanner. The luggage and parcel scanning device 16 also includes a video display device, such as an LCD screen 20 and an operator input control console 22.

Figure 6:
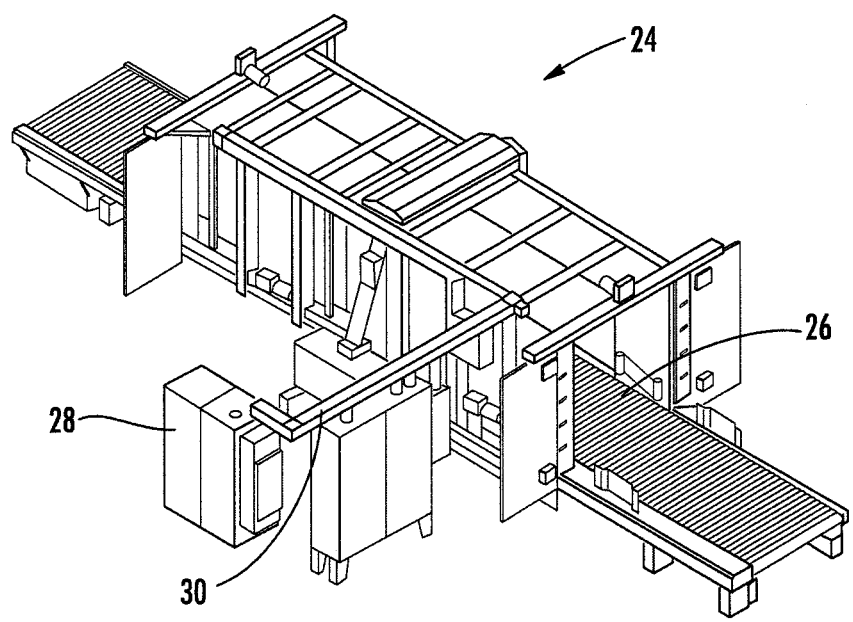
FIG. 6 is a perspective view of a dual energy x-ray scanning device designed for palletized luggage or parcels.

FIG. 6 illustrates a palletized package and luggage scanner 24 that is sized and configured to handle pallets of packages and luggage. This scanner 24 for palletized material includes a conveyor 26 that can handle material weighing up to approximately 5,000 pounds at a speed of up to forty feet per minute. Similar to the smaller package and luggage scanner 16 disclosed in FIG. 5, the pallet sized scanner includes a display monitor 28 and an input station 30.

Figure 7:
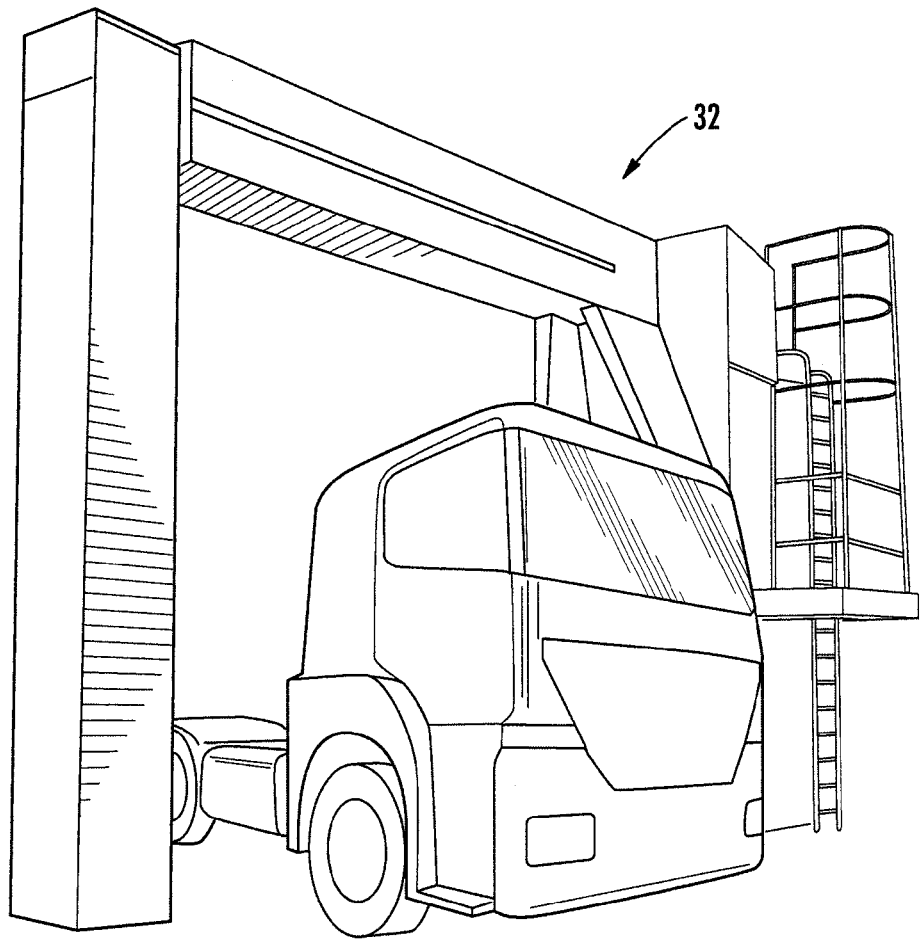
FIG. 7 is a perspective view of a fixed dual energy x-ray scanning device for trucks and cargo.

FIG. 7 is a perspective view of a fixed dual energy x-ray scanning device 32 for trucks and cargo. Fixed dual energy x-ray scanning device 32 is sized and configured to enable continuous drive through inspection of trucks. With this system it is possible to scan up to 180 vehicles per hour. While mounted in a fixed installation it is possible to take the system apart and reinstall in a different location.

Typically these scanning stations will be used at border crossings, shipping ports, airports and other high security installations, and can be used to scan trucks, containers, vehicles and individuals, etc. The amount of radiation emitted from such a device is equivalent to approximately one hour of background radiation, or 5 micro rem per scan. High volume installations require a system that can deliver rapid and accurate processing. Typically this system can effectively scan objects passing through at speeds of up to ten miles per hour. The dual energy transmission x-ray image can clearly differentiate between materials of different density, such as organic and metallic material. As the object passes through the scanner a complete image of its contents are displayed on a monitor and the data from the image is input into the computer system.

Figure 8:
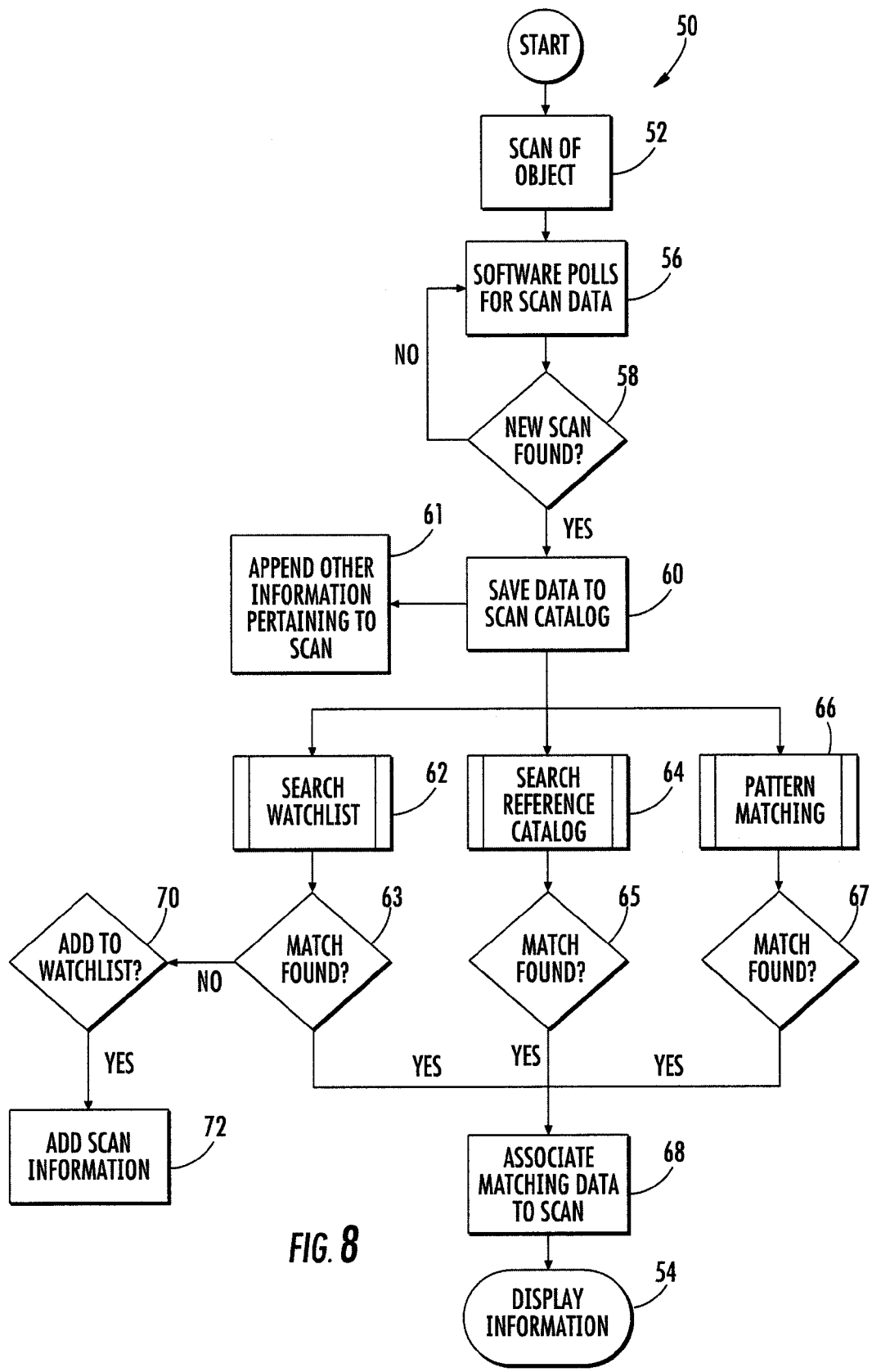
FIG. 8 is a schematic representation of the scanning system's software configuration.

FIG. 8 is a flow chart representation of the scanning system's computer configuration 50. The system 50 includes scanning equipment 52 which in turn is connected to the scanning system's computer system. The scanning equipment 52 is capable of taking multiple images of the scanned object from multiple perspectives. Initially the computer software will look for and retrieve and process the image data as it is generated from scanner 52 at step 56. The hardware includes a video display 54 which can display the image generated by the dual energy x-ray scanning equipment 52 as well as other information and data. Next, a decision is made at step 58. If no new data is found, the process returns to step 56. If new data is found the system proceeds to step 60. The data is then saved to a scan catalog at step 60 and additional associated object information such as, the bill of lading for cargo, a license plate for car scan, or tag identifier for baggage, is tagged to the object at step 61. The data output from step 60 is then moved to search watch list 62, search reference catalog 64 and pattern matching data 66. If the new data entering the search watch list is found at step 62 a decision is made at step 63 to match the data that is associated with the scan at step 68 and display it on device 54. If the new data entering the watch list is not found at step 62 then a further decision is made at step 70. The decision to add this data to the watch list is made at step 70. If the determination is yes, then the scan information is added to the watch list as indicated at step 72. Likewise, if the new data entering the search reference catalog 64 is found, a decision to match this data is made at step 65 and is then associated with the scan at step 68 and displayed on device 54. In a similar fashion, if a pattern match is found in step 67 the matching data is associated with the scan at step 68 and displayed on video display device 54. The patterns would be automatically identified by the pattern correlation engine by comparing live real-time data to stored information, watch lists, etc. The pattern correlation engine would be continually running in the background mining data.

The data retrieved from the scanning device may also be communicated to various storage devices located proximate or remote from the scanning station. The computer architecture includes a reference library. At the core of the reference library is a library of images, annotated with key information. The library is configured to store information pertaining to vehicles, containers, and other types of storage conveyances. The library includes a reference section and a scan catalog.

The reference section stores one or more images that create a "video signature" of the object. In addition to these images, each entry contains a configurable number of attributes that are used to provide additional information about the object identified by the signature. The scan catalog contains an archive of actual scans that can be correlated to both the reference library and also future events. For example, if it's an automobile reference section, the software contains an array of images for every make and model of automobile along with pertinent information such as gross weight, available seating, gas tank volume, and frame construction and configuration. In its scanned catalog, it contains a list of every instance that a vehicle with that specific license plate was scanned. The plate number can be manually entered or automatically entered by a camera imaging system that can read the license plate.

The computer architecture also includes a configurable watch list. This list may be created and maintained automatically, semi-automatically, or manually, depending on the technological capabilities of the customer. The list contains information software that identifies data to be on the watch for. In the case of car scans, this would include a list of "hot" license plates or a particular vehicle, or truck and a complete listing of motor vehicle records. In the case of port container scans, the watch list may be the manifests for containers presenting that day. Notwithstanding the contents of the list, the concept remains the same and the software will watch for any entries on the list.

The computer architecture is capable of real time analytics. When the scan occurs, the scanning software presents data to the computer architecture. In the case of a car scanning, this may include multiple feeds including a license plate read as well as one or more images from the vehicle. The system's software provides a standard interface for accepting this information in a push fashion, or it may poll the imaging systems in real time to collect the necessary information. The system's software immediately catalogs the scanned imagery into the scan catalog section of the library.

In the automobile example, the system now knows that on a given date, at a given time, an automobile with a particular video signature crossed the border with three people within the vehicle.

As the dual energy x-ray scan is performed and the associated data is stored, real time analytics can be performed. The real time analytics will find and retrieve information related to this particular scan. If the automobile's license plate or the container's manifest is stored in the watch list, that information will be instantly retrieved and displayed to the user or users. The real time analytics will find and retrieve information from the reference library correlated to the particular scan and any particular watch list data. For example, in the container scenario, if the manifest states that the container is a particular type of container and it contains bananas, it can immediately compare its signature to the current scan. In the case of an automobile, if the license plate is found on the watch list and it is supposed to belong to a particular make and model car, that data will be retrieved from the reference library and compared to the imagery data from the current scan. The real time analytic will also perform advanced pattern correlations. The system's software will constantly monitor its database and compare new data with existing data in search of unusual trends, correlations or patterns. For example, the company whose container is being scanned has had an unusual number of shipments to and/or from a particular port in the last month. Likewise, the vehicle that was just scanned has been crossing the border during an unusual time window every Tuesday for the past two months and then returning two hours later with fewer people.

It is contemplated that the responsible governmental agency will have each of their scanning devices networked in the scanning system, thereby creating a very comprehensive amount of library data.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A non-destructive scanning system to identify hazardous materials or potential dangers comprising:
    a scanning device capable of producing an electronic image of a scanned object,
    a computer system in communication with said scanning device, and a data storage device in communication with said scanning device and said computer system, said computer system including an architecture that includes a reference library,
    said reference library includes a reference section and a scan catalog,
    said architecture further including a configurable watch list that may be created and maintained automatically, semi-automatically, or manually,
    said computer architecture including real time analytics that will find information from said reference library and configurable watch list and correlate said electronic image of said scanned object to said information,
    said computer architecture including an output indicative of match between the scanned object and said reference library and said configurable watch list.

2. The non-destructive scanning system to identify hazardous materials or potential dangers of claim 1, wherein the scanning device is a dual energy x-ray system.

3. The non-destructive scanning system to identify hazardous materials or potential dangers of claim 2, wherein the scanning device further includes a photographic digital camera device.

4. The non-destructive scanning system to identify hazardous materials or potential dangers of claim 1, wherein said reference section stores one or more images that create a video signature of the object whereby each image includes a configurable number of attributes that are used to provide additional information about the object identified by the signature.

5. The non-destructive scanning system to identify hazardous materials or potential dangers of claim 1, wherein said scan catalog contains an archive of actual scans that can be correlated to both the reference library and also future events.

6. The non-destructive scanning system to identify hazardous materials or potential dangers of claim 1, wherein said configurable watch list contains software information that identifies data to be on the watch for.

7. The non-destructive scanning system to identify hazardous materials or potential dangers of claim 1, wherein multiple electronic images are taken of each object to be scanned.

8. The non-destructive scanning system to identify hazardous materials or potential dangers of claim 1, wherein said real time analytics will find and retrieve information related to said electronic image from the reference library and said configurable watch list as well as perform advanced pattern correlations whereby the computer architecture will constantly monitor its database and compare new data with existing data in search of unusual trends, correlations or patterns.

9. The non-destructive scanning system to identify hazardous materials or potential dangers of claim 1, wherein said output is communicated to a video display device.

10. The non-destructive scanning system to identify hazardous materials or potential dangers of claim 1, wherein said computing system is communication with a plurality of scanning devices.

11. A method for identifying hazardous materials or potential dangers comprising the steps of:
    using a scanning device to produce an electronic image of a scanned object, introducing said electronic image into a computer system, connecting a data storage device with said scanning device and said computer system, providing said computer system with a computer architecture that includes a reference library, including a reference section and scan catalog within said reference library, providing said computer architecture with a configurable watch list, including real time analytics in said computer architecture whereby the real time analytics will find the information from the reference library and configurable watch list and correlate said electronic image of said scanned object to said information, generating an output indicative of a match between the scanned object and said reference library and said configurable watch list.

12. The method for identifying hazardous materials or potential dangers as set forth in claim 11 further comprising the step of: using a dual energy x-ray system to scan said object and produce said electronic image.

13. The method for identifying hazardous materials or potential dangers as set forth in claim 11 further comprising the step of scanning said object with a photographic digital camera.

14. The method for identifying hazardous materials or potential dangers as set forth in claim 11 further comprising the step of storing one or more images of said scanned object in said reference section to create a video signature of said object whereby each image includes a configurable number of attributes that are used to provide additional information about the object identified by the signature.

15. The method for identifying hazardous materials or potential dangers as set forth in claim 11 further comprising the step of storing and archiving of actual scans into said scan catalog, whereby said actual scans can be correlated to both the reference library and also future events.

16. The method for identifying hazardous materials or potential dangers as set forth in claim 11 further comprising the step of providing software to said configurable list that identifies data to be on the watch for.

17. The method for identifying hazardous materials or potential dangers as set forth in claim 11 further comprising the step of producing multiple electronic images of a scanned object.

18. The method for identifying hazardous materials or potential dangers as set forth in claim 11 wherein said real time analytics will find and retrieve information related to said electronic image from the reference library and said configurable, watch list, as well as perform advanced pattern correlations whereby the computer architecture will constantly monitor its database and compare new data with existing data in search of unusual trends, correlations or patterns.

19. The method for identifying hazardous materials or potential dangers as set forth in claim 11 further comprising the step of displaying said output on a video display device.

20. The method for identifying hazardous materials or potential dangers as set forth in claim 11 further comprising the step of connecting a plurality of scanning devices to said computing system.

* * * * *